United States Patent
Kobayashi et al.

(10) Patent No.: US 7,412,365 B2
(45) Date of Patent: *Aug. 12, 2008

(54) ENVIRONMENTAL IMPACT ESTIMATION METHOD AND APPARATUS

(75) Inventors: Hideki Kobayashi, Yokohama (JP); Akinori Hongu, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 416 days.

This patent is subject to a terminal disclaimer.

(21) Appl. No.: 10/323,792

(22) Filed: Dec. 20, 2002

(65) Prior Publication Data

US 2003/0125999 A1 Jul. 3, 2003

(30) Foreign Application Priority Data

Dec. 28, 2001 (JP) ............................. 2001-401856

(51) Int. Cl.
*G06G 7/48* (2006.01)
*G06F 9/455* (2006.01)
*G06F 19/00* (2006.01)

(52) U.S. Cl. ...................... 703/6; 703/2; 703/7; 705/7; 700/97

(58) Field of Classification Search ..................... 703/2, 703/6, 7; 705/7; 700/97
See application file for complete search history.

(56) References Cited

U.S. PATENT DOCUMENTS

| | | | |
|---|---|---|---|
| 5,652,708 A | | 7/1997 | Miyamoto et al. |
| 5,852,560 A | * | 12/1998 | Takeyama et al. ............. 700/97 |
| 5,965,858 A | * | 10/1999 | Suzuki et al. ................ 235/375 |
| 6,811,344 B1 | * | 11/2004 | Kobayashi et al. ............. 403/2 |
| 7,054,797 B2 | * | 5/2006 | Kobayashi et al. ............. 703/2 |

(Continued)

FOREIGN PATENT DOCUMENTS

JP 5-314094 11/1993

(Continued)

OTHER PUBLICATIONS

Zhou, Mengchu et al., "Evaluation of Environmentally Conscious Product Designs". 1998 IEEE Int'l Conf. on Systems, Man, and Cybernetics. Oct. 1998. vol. 4, pp. 4057-4061.*

(Continued)

*Primary Examiner*—Paul Rodriguez
*Assistant Examiner*—Ayal Sharon
(74) *Attorney, Agent, or Firm*—Oblon, Spivak, McClelland, Maier & Neustadt, P.C.

(57) ABSTRACT

An environmental impact estimation method comprising storing information related to reuse and recycle objects in a memory unit, performing life cycle modeling to make a life cycle model, the life cycle modeling including reading information related to the reuse and recycle objects, selecting some of the reuse and recycle objects which can be diverted to a new product, and combining the reuse and recycle objects selected together to assemble new product, predicting, as a superposition of two or more arbitrary shapes, recovery distribution of products by the life cycle modeling to predict a recovery quantity of the reuse and recycle objected, using the life cycle model, determining the arbitrary shapes as a peak of the product worth life or product useful life, and evaluating an environmental impact and a cost to bear in reuse or recycle based on prediction result.

8 Claims, 13 Drawing Sheets

U.S. PATENT DOCUMENTS

| | | | |
|---|---|---|---|
| 2001/0029461 A1* | 10/2001 | Kobayashi | 705/8 |
| 2002/0099587 A1* | 7/2002 | Kakihana et al. | 705/7 |
| 2005/0267781 A1* | 12/2005 | Kobayashi et al. | 705/2 |

FOREIGN PATENT DOCUMENTS

| | | | |
|---|---|---|---|
| JP | 05314094 A * | 11/1993 | |
| JP | 09/73491 | 3/1997 | |
| JP | 09073491 A * | 3/1997 | |
| JP | 10-240715 | 9/1998 | |
| JP | 10240715 A * | 9/1998 | |
| JP | 11-288427 | 10/1999 | |
| JP | 11288427 A * | 10/1999 | |
| WO | WO 01/59640 | 8/2001 | |
| WO | WO 01/59640 A2 * | 8/2001 | |

OTHER PUBLICATIONS

Anderi, R. et al. "Design for Environment—A Computer-Based Cooperative Method to Consider the Entire Life Cycle." Proc. EcoDesign '99: 1st Int'l Symposium on Environmentally Conscious Design and Inverse Manuf. Feb. 1999. pp. 380-385.*

Luo, Yanchun et al. "Lifecycle Analysis for Environmentally Conscious Solid Freeform Manufacturing." Proc. of the 2000 IEEE Int'l Symposium on Electronics and the Environment. May 2000. pp. 33-38.*

Yan, Pingtao et al. "Multi-Lifecycle Product and Process Development: Selection of Optimal Production, Usage, and Recovery Processes." Proc. of the 1999 Int'l Symposium on Electronics and the Environment. May 1999. pp. 274-279.*

Thomas, V. et al. "Information Technology and Product Lifecycle." Proc. 1999 IEEE Int'l Symposium on Electronics and the Environment. May 1999. pp. 54-57.*

Moeller, A. et al. "Eco-product Lifecycle Management". Proc. EcoDesign 2001. Dec. 11-15, 2001. pp. 739-744.*

Mosovsky, J. "Assessing Product Design Alternatives with Respect to Environmental Performance and Sustainability." Proc. 2001 IEEE Int'l Symposium on Electronics and the ENvironment. May 7-9, 2001. pp. 252-257.*

Muller, A. "Product-Based Environmental Performance Metrics." Proc. 2000 IEEE Int'l Symposium on Electronics and the Environment. May 2000. pp. 93-98.*

Gao, Meimei et al. "Development of Demanufacturing Maodule for Multi-Lifecycle Assessment and Analysis of Products." 2001 IEEE Int'l Conf. on Systems, Man and Cybernetics. Oct. 2001. pp. 1856-1861.*

Kobayashi, K. et al. "The Optimal Repairing Rules Under Demand Risk". 2000 IEEE Int'l Conf. on Systems, Man, and Cybernetics. Oct. 2000. vol. 1, pp. 560-565.*

Kobayashi, H. "Life Cycle Planning Methods for Environmentally Conscious Products." Proc. 1999 IEEE Int'l Symposium on ELectronics and Environment. May 1999. pp. 87-91.*

M. Zhou, et al., Emerging Technologies and Factory Automation EFTA Proceedings, 1996 IEEE Conference, XP-010204150, pp. 385-391, "A Cost Model For Multi-Lifecycle Engineering Design", Nov. 18, 1996.

D. G. Dalke, et al., Electronics and The Environment, ISEE 1994 Proceedings IEEE International Symposium, XP-010120125, pp. 187-190, "Product Environmental Impact Assessments", May 2, 1994.

Patent Abstracts of Japan, JP 11-025064, Jan. 29, 1999.

T. Hoshino, et al. "Optimization Analysis for Recycle-Oriented Manufacturing Systems," Int. J. Production Research, vol. 33, No. 8, 1995, pp. 2069-2078.

Tomioka Tsunenori et al., "IT utilization strategy in corporations for products, correspondence to short life, low price and component recycling" in "Nikkei Digital Engineering" published by Nikkei BP, Jan. 15, 2000, No. 26, pp. 104-111.

Watanabe Tomlo et al., "Recycling technology of copier components, Prediction of rest of life by strategic manner and technical analysis" in "Nikkei Mechanical" published by BP, Sep. 8, 1997, No. 514, pp. 22-23.

Kimura Fumihiko, "Elecronic information communication technology of the 21th century" in the report published by the Institute of Electronics, Information and Communication Engineers, Aug. 25, 1997, vol. 80, No. 8, pp. 791-797.

* cited by examiner

PRODUCT DATA

| PRODUCT NUMBER i | PRODUCT NAME | NEXT GENERATION MODEL NUMBER | USEFUL LIFE $la(i)$ | WORTH LIFE $lr(i)$ | MANUFACTURING START TIME | ALLOWABLE MANUFACTURING PERIOD | TOTAL NUMBER OF MANUFACTURED PRODUCTS $P(i)$ | PRODUCT RECOVERY RATE $C(i)$ |
|---|---|---|---|---|---|---|---|---|
| 1 | A | 2 | 12 | 6 | 1 | 6 | 600000 | 0.8 |
| 2 | B | - | 12 | 6 | 3 | 6 | 600000 | 0.8 |
| 3 | C | - | 10 | 6 | 1 | 6 | 900000 | 0.8 |

PART USE QUANTITY DATA

| | PART NUMBER m | | | |
|---|---|---|---|---|
| PRODUCT NUMBER i | 1 | 2 | 3 | 4 |
| 1 | 1 | 1 | 0 | 0 |
| 2 | 1 | 1 | 0 | 0 |
| 3 | 0 | 1 | 1 | 1 |

PART DATA

| PART NUMBER m | PART NAME | WEIGHT (g) | MATERIAL ACQUISITION $CO_2$ (g) | PART COST (YEN) | RECOVERY / INSPECTION $CO_2$ (g) | RECOVERY / INSPECTION COST (YEN) |
|---|---|---|---|---|---|---|
| 1 | 14-INCH LCD | 800 | 3500 | 20000 | 100 | 500 |
| 2 | NOTEBOOK TYPE PC MAIN BODY | 1200 | 65300 | 90000 | 160 | 800 |
| 3 | 15-INCH LCD | 900 | 3600 | 40000 | 100 | 500 |
| 4 | POWER SUPPLY BOX | 1000 | 21000 | 25000 | 80 | 400 |

THESE ITEMS OF DATA ARE SELECTIVELY READ FROM ENVIRONMENTAL IMPACT INFORMATION DATA BASE (DB) AND COST INFORMATION DATA BASE (DB)

F I G. 8A

| PART NUMBER m | NUMBER j OF PARTS TARGETED PARTS |
|---|---|
| 1 | 1 |
| 2 | 2 |
| 3 | - |
| 4 | - |

| REUSE PART DATA | NUMBER j OF PARTS TARGETED FOR REUSE | REUSE SOURCE MANUFACTURING NUMBER i | REUSE DESTINATION MANUFACTURING NUMBER i |
|---|---|---|---|
| | 1 | 1 | 3 |
| | 2 | 1 | 2 |

| COMMON DATA | |
|---|---|
| $CO_2$ PRODUCED PER PRODUCT MANUFACTURE (g) | COST PER PRODUCT (YEN) |
| 3200 | 200 |
| $CO_2$ PRODUCED PER PRODUCT DISTRIBUTION (g) | COST PER PRODUCT (YEN) |
| 15 | 2000 |
| $CO_2$ PRODUCED PER YEAR (g) | COST PER YEAR (YEN) |
| 850 | 3000 |
| $CO_2$ PRODUCED PER UNIT WEIGHT RECOVERY (g) | COST PER UNIT WEIGHT |
| 0.1 | 1 |
| $CO_2$ PRODUCED PER UNIT WEIGHT DISCARDING (g) | COST PER UNIT WEIGHT |
| 0.8 | 0.5 |

THESE ITEMS OF DATA ARE SELECTIVELY READ FROM ENVIRONMENTAL IMPACT INFORMATION DATA BASE (DB) AND COST INFORMATION DATA BASE (DB)

FIG. 8B

ENVIRONMENTAL IMPACT ESTIMATION METHOD AND APPARATUS

CROSS-REFERENCE TO RELATED APPLICATIONS

This application is based upon and claims the benefit of priority from the prior Japanese Patent Application No. 2001-401856, filed Dec. 28, 2001, the entire contents of which are incorporated herein by reference.

BACKGROUND OF THE INVENTION

1. Field of the Invention

The present invention relates to a method and an apparatus for aiding planning, development, design, and estimation of an environmentally conscious product. In particular, the present invention relates to a plan aiding method and apparatus for carrying out environmental impact estimation and cost estimation effective in planning multi-generation products.

2. Description of the Related Art

With the development of trade and industry, due to the greenhouse effect caused by increasing exhaust gases, there have been a variety of problems such as global warming, destruction of nature caused by the tremendous amount of waste and environmental pollution caused by toxic substances. Thus, it is important to reduce the environmental impact of industrialized nations on the earth.

In considering the environmental impact of industry, it is insufficient to focus just on the manufacture of products and process up to the shipment of the manufactured article. Attention should also be paid to the discarding steps, including recycling.

It is required to plan environmental impact reduction from the viewpoint of a product life cycle from manufacture to discarding. There has been increased importance placed on the technology for developing products so that the environmental impact of a product life cycle, from manufacture to discarding of the products is reduced more reliably than conventional methods. It is anticipated that a design aiding technique for product design that places most importance of such a life cycle processing will be developed.

A technique of calculating environmental impact, or environmental load concerning the entire life cycle of products—LCA (Life Cycle Assessment) exists, as specified by ISO 14040.

This LCA calculates "environmental impact", i.e. affects on the environment, such as $CO_2$ (carbon dioxide gas) or NOx (nitrogen oxide) generated in the life cycle of products (inventory analysis), and estimates environmental impact (impact analysis). Therefore, there can be supplied environmentally conscious products capable of realizing the design solution (product and product life cycle progress) of the LCA, and reducing the environmental impact if the design solution is improved based on the estimation result.

However, the conventional LCA technique averages and calculates the environmental impact of a single product. In this technique, for example, in so called multi-generation products in which one product model is manufactured as a product of a basic design being modified over multiple generations, in the case where products are recovered to remove specific parts, and the removed parts are reused in a series of the same products, it must be assumed that the supply quantity of reuse parts and the necessary quantity of parts thereof are well balanced.

Namely, in the case of considering reuse, multi-generation products in which one product model is developed through partial improvements over multiple generations is most suitable. This is because new products are often composed of the same parts as the constituent parts of old products. Such product manufacturing of multi-generation products denotes that there are products, which have been used and become unnecessary, are recovered, the constituents of which become available for reuse.

In recent years, as represented by a film with lens (disposable camera), so called reuse of parts in which discarded products are recovered and disassembled by manufacturers, and the disassembled parts are reused as parts of subsequent products is requested for other manufactured articles.

For manufactured articles, constituent parts are standardized, thereby enabling wide and general reuse of parts without being limited to multi-generation products.

If the conventional LCA technique is applied for that purpose, the technique must have been utilized assuming that the supply quantity of reuse parts and the necessary quantity of the parts are well balanced.

However, the impact that the actual reuse of parts has on the environment greatly depends on the balance between a supply quantity of reuse parts and the necessary amount of parts derived from a quantity of manufactured products that incorporate the parts.

Namely, if the supply quantity of reuse parts is smaller than the necessary quantity, the number of new parts must be increased. Conversely, if an excessive amount of reuse parts are supplied, they must be discarded. Therefore, in order to precisely estimate an effect of reuse of parts on the environment, thereby achieving product manufacture with less environmental impact, LCA must be carried out in multi-generation products in consideration of the quantity of manufactured products.

That is, in order to precisely estimate an effect of reuse of parts on the environmental impact, the LCA must be carried out in multi-generation products in consideration of the quantity of manufactured products.

This applies to where material recycling is performed in a series of the same products.

In addition, for calculating the entire cost of the life cycle of one product, the concept of life cycle costing (LCC) is adopted.

LCC denotes the cost of the entire product life cycle from material acquisition to discarding. With respect to LCC as well, as with LCA, in order to precisely estimate the effect of reuse of parts on the environment, LCC must be applied to multi-generation products considering the quantity of manufactured products. Of course, this applies to material recycling of a series of the same products.

However, in conventional technology, conditions for reusing parts or material recycling have been met on the assumption that the supply quantity and necessary quantity of parts are balanced, thus it was impossible to precisely estimate environmental impact or the entire cost of multi-generation products.

That is, as long as products are manufactured as company activity, the manufacturing cost cannot be ignored. Thus, the manufacturing cost must be included within the range satisfied as economic activities. Therefore, companies need to manufacture products effectively in consideration of LCA or LCC. For that purpose, during development and planning of multi-generation products, it is required to enable realistic prediction while the supply quantity of reuse parts or recycle materials useable in a series of the same products is precisely reflected. That is, it is required to enable realistic prediction while events concerning reuse of parts or recycling are considered as uncertain factors.

However, the conventional technique originally assumes that the supply quantity of reuse parts and the necessary quantity of the parts are well balanced, and thus, realistic estimation cannot be performed.

Therefore, it is an object of the present invention to provide an environmental impact estimating method and apparatus and a program for, when products are manufactured considering reuse of parts or material recycling, precisely predicting and estimating the environmental impact or cost produced from a group of products in multi-generation products, making it possible to execute effective reuse of parts or effective material recycling.

BRIEF SUMMARY OF THE INVENTION

According to a first aspect of the invention, there is provided an environmental impact estimation method comprising: storing information related to reuse objects and recycle objects in a memory unit; performing life cycle modeling to make a life cycle model, the life cycle modeling including reading the information related to the reuse objects and the recycle objects from the memory unit, selecting some of the reuse objects and the recycle objects which can be diverted to a new product from a recovery product using the information read, and combining the reuse objects and the recycle objects selected together to assemble the new product; predicting, as a superposition of a plurality of arbitrary shapes, recovery distribution of products used as the reuse objects by the life cycle modeling to predict a recovery quantity of the reuse objects and/or the recycle objects, using the life cycle model, at least one of the arbitrary shapes having a peak corresponding to a product worth life or a product useful life; and evaluating an environmental impact and a cost involved in reuse or recycle based on prediction result obtained by the predicting.

According to a second aspect of the invention, there is provided a product recovery prediction method comprising: inputting a useful life of a product, a worth life of the product, a rate of users using the useful life of the product as a disposal main factor, a product recovery rate, a product manufacture period, the number of products, a number-of-products distribution shape, and a recovery distribution shape; generating a number-of-products distribution in the manufacture period according to the number-of-products distribution shape; and generating a number-of-recovery products from the number-of-products distribution, the recovery rate, the recovery distribution shape, the worth life of the product and a useful life of the product.

According to a third aspect of the invention, there is provided an environmental impact estimation program comprising: means for instructing a computer processor to store information related to reuse objects and recycle objects in a memory unit; means for instructing the computer processor to perform life cycle modeling to make a life cycle model, the life cycle modeling including reading information related to the reuse objects and the recycle objects from the memory unit, selecting some of the reuse objects and the recycle objects which can be diverted to a new product from a recovery product using read information, and combining the reuse objects and recycle objects selected together to assemble the new product; means for instructing the computer processor to predict, as a superposition of two or more arbitrary shapes, recovery distribution of products used as reuse objects by the life cycle modeling in order to predict a recovery quantity of at least one of the reuse objects and recycle objects, using the life cycle model; means for instructing the computer processor to determine at least one of the arbitrary shapes as a peak of the product worth life or product useful life; and means for instructing the computer processor to evaluate an environmental impact and a cost to bear in reuse or recycle based on prediction result obtained by the predicting.

According to a fourth aspect of the invention, there is provided A reuse scheduling support apparatus in executing at least one of reuse of parts of a product and materials recycling, the apparatus comprising: a modeling unit configured to execute life cycle modeling between reuse products that is a process for performing definition for deciding what parts of a recovery product should be diverted to what new product; a prediction unit configured to predict feeding quantity of reuse parts by applying a model modeled by the modeling unit; and an environmental impact and cost evaluation unit configured to evaluate environmental impact and cost that have to bear in recycle on the basis of a prediction result of the prediction unit.

BRIEF DESCRIPTION OF THE SEVERAL VIEWS OF THE DRAWING

FIGS. 8A and 8B shows a result of life cycle modeling;

DETAILED DESCRIPTION OF THE INVENTION

Figure 1:
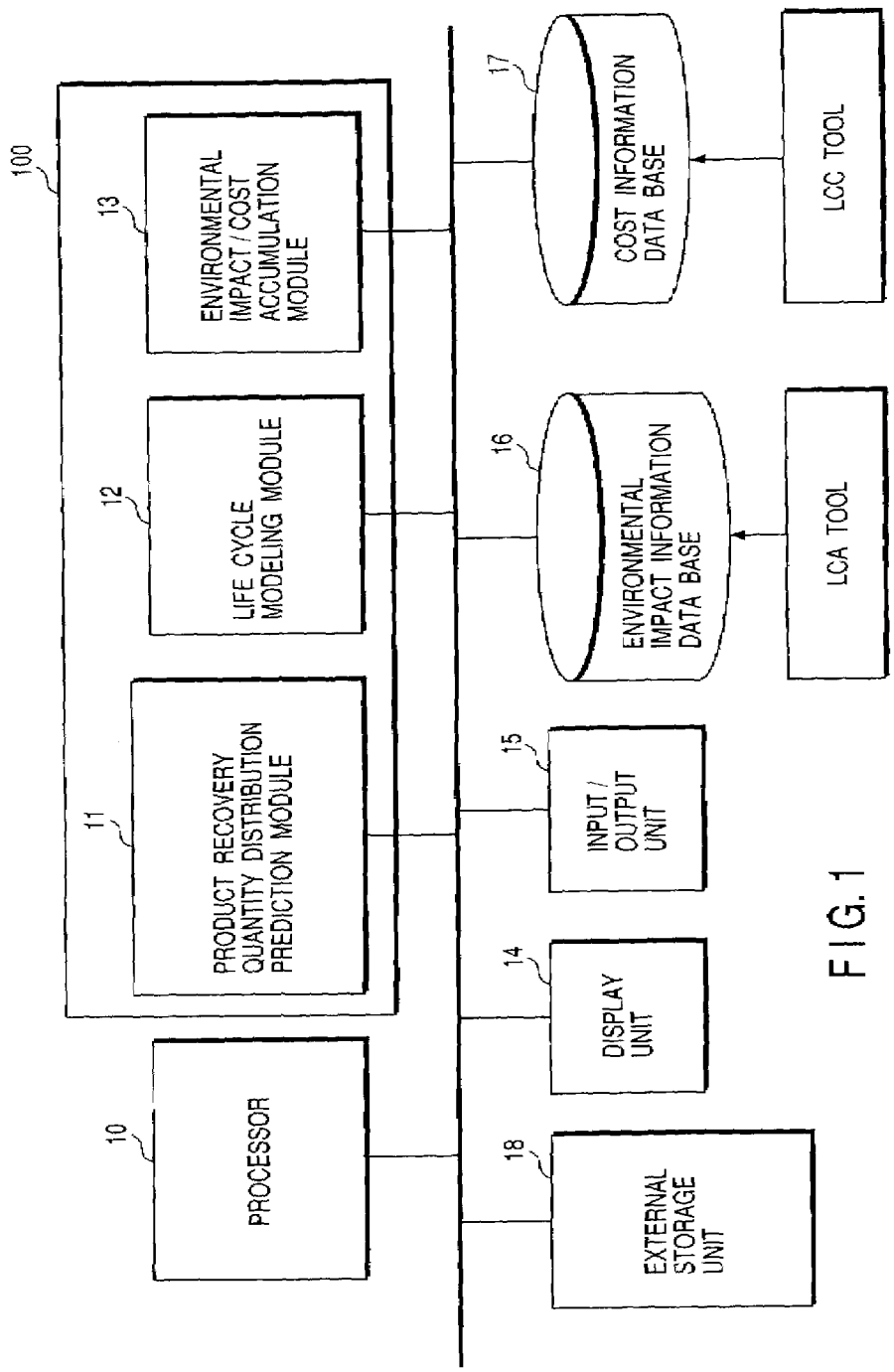
FIG. 1 shows a block diagram for explaining an environmental impact estimation apparatus according to an embodiment of the present invention.

The present invention provides a technique for simultaneously evaluating the influence a group of multi-generation products has on the environment, and the costs occurring in a company, when carrying out parts reuse and materials recycling. Embodiments of the present invention will be described referring to the drawings.

FIG. 1 shows an environmental impact estimation apparatus according to an embodiment of the present invention.

The environmental impact estimation apparatus comprises a processor (CPU) 10, a product recovery quantity distribution prediction unit 11, a life cycle modeling unit 12, an environmental impact/cost integration unit 13, a display unit 14, an I/O unit 15, an environmental impact information database 16, a cost information database 17, and an external storage unit 18. A product manufacture quantity/recovery distribution prediction module 11, a life cycle modeling module 12 and an environmental impact/cost integration module 13 are realized by a program loaded in a memory 100. The processor 10 executes various control processes including input/output control and various arithmetic processes by executing the program loaded in the memory 100 from the external storage 18.

The product recovery quantity distribution prediction unit 11 is configured to predict quantity of reuse parts/recycling materials which are supplied to each product constructing the multi-generation product. The prediction unit 11 processes propositions how many of what products can be recovered in what fiscal year, how many parts can be used as those of next products, or how much of what material can be reused as raw materials. Further, the life cycle modeling module 12 performs life cycle modeling of the multi-generation products.

The environmental impact/cost integration module 13 computes environmental impact and costs as the entire multi-generation product. The display unit 14 displays information assisting an operation of the present system and result contents such as process result, input contents, input screen, etc. The I/O unit 15 is an interface between the life cycle schemer who is an operator, and the system, and comprises a keyboard and a pointing device as input units, and a printer and an audio device as output units.

The environmental impact information database (DB) 16 saves environmental impact information regarding materials supply of a product, manufacture, circulation, activity, recovery/disposal stage, and environmental impact information occurring in parts reuse/materials recycling. The information is acquired by a LCA tool. Cost information database (DB) 17 saves cost information regarding materials supply of a product, manufacture, circulation, activity, recovery/disposal stage, and cost information occurring in parts reuse/materials recycling. The information is acquired by a LCC tool.

The LCA tool computes "environmental load" occurring in the life cycle of a target product, i.e., performs inventory analysis, and evaluates affect on the environment, i.e., performs impact analysis. A design solution (a product and product life cycle process) is evaluated by the LCA tool. Development of products reducing environmental impact is possible by improving the design solution on the basis of the evaluation result. The LCC tool is a support tool for performing computation of cost expended in the entire product life cycle from materials supply to disposal. The external storage 18 saves a result on the way of evaluation, a final result and a program.

<Description of an Operation>

The operation of the system of the present embodiment will be described referring to FIG. 2. The system computes environmental impact and costs and provides them as the entire multi-generation product in accordance with steps S1 to S4 shown in FIG. 2. In other words, four steps of life cycle modeling (S1), prediction of product recovery quantity distribution (S2), environmental impact/cost integration (S3) and presentation of environmental impact/cost integration (result displaying/saving) (S4) are executed sequentially. When the system according to the embodiment of the present invention carries out parts reuse and materials recycling, the environmental impact estimation and cost evaluation are performed by the environmental impact estimation and cost integration module 13. However, before the evaluation the life cycle modeling of the multi-generation product is performed (step S1 of FIG. 2). This life cycle modeling process defines deciding that what of collected previous generation product should be diverted to which of what kind of next generation product to be produced from now on, and performed by life cycle modeling module 12 in the memory. The life cycle modeling performed by this life cycle modeling module 12 is explained in detail on page 18, line 19 to page 25, line 16 of U.S. patent application Ser. No. 09/893,874.

In this life cycle modeling process, the icons prepared by iconizing part names are grouped into some groups, and product information ("product name", "next model name", "product useful life", "manufacturing start year", "possibility total manufacturing number" etc.) corresponding to grouped products respectively is input to the system. Product LCA information and LCC information of component parts of the product of the next model name are attached to "the next model name" as related information. The result of the life cycle modeling is displayed on the display unit 14 as the model shown in FIG. 3.

Figure 2:
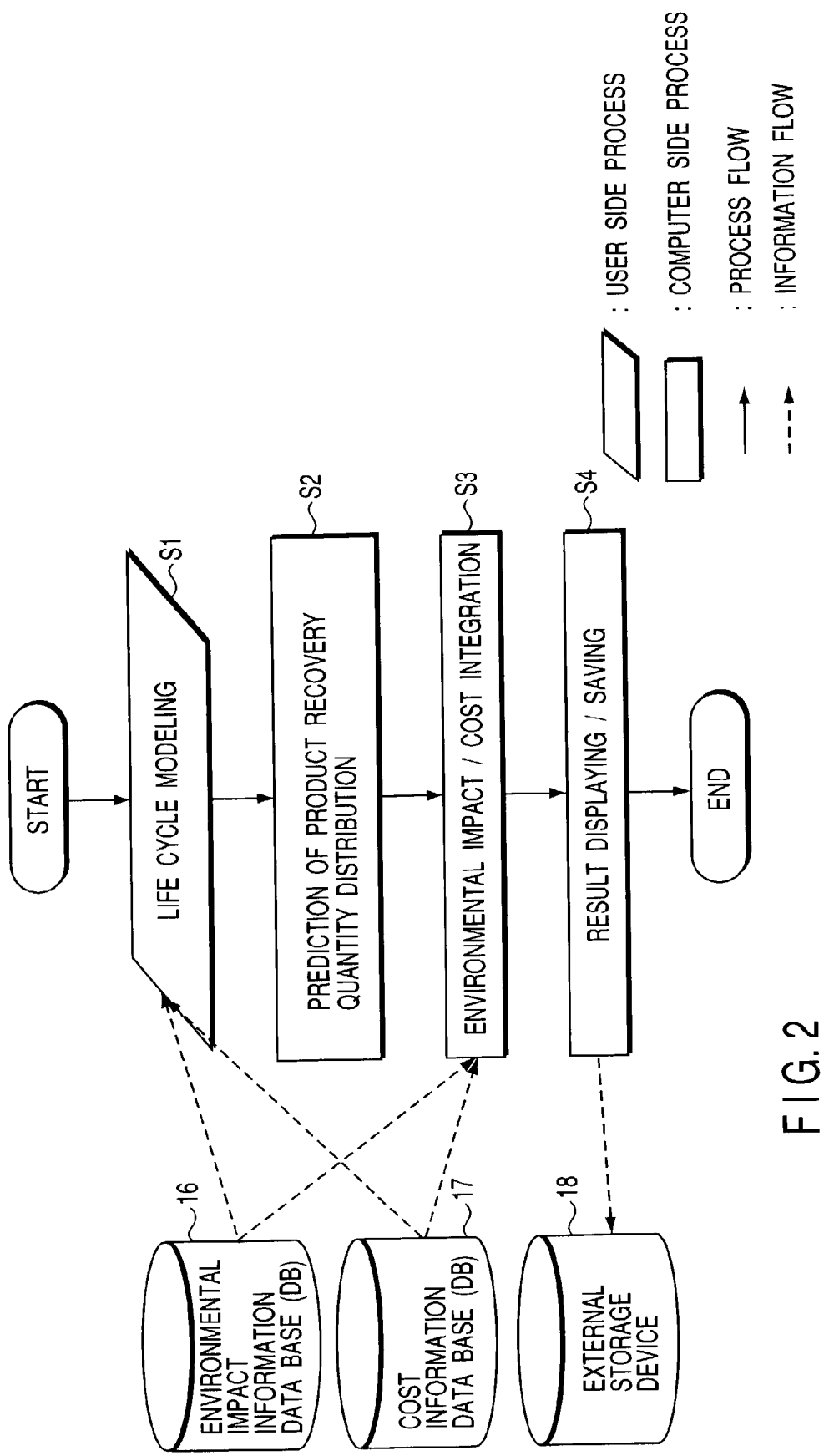
FIG. 2 is a flowchart showing a process procedure of environmental impact estimation and cost evaluation according to the embodiment of the present invention.
Figure 4:
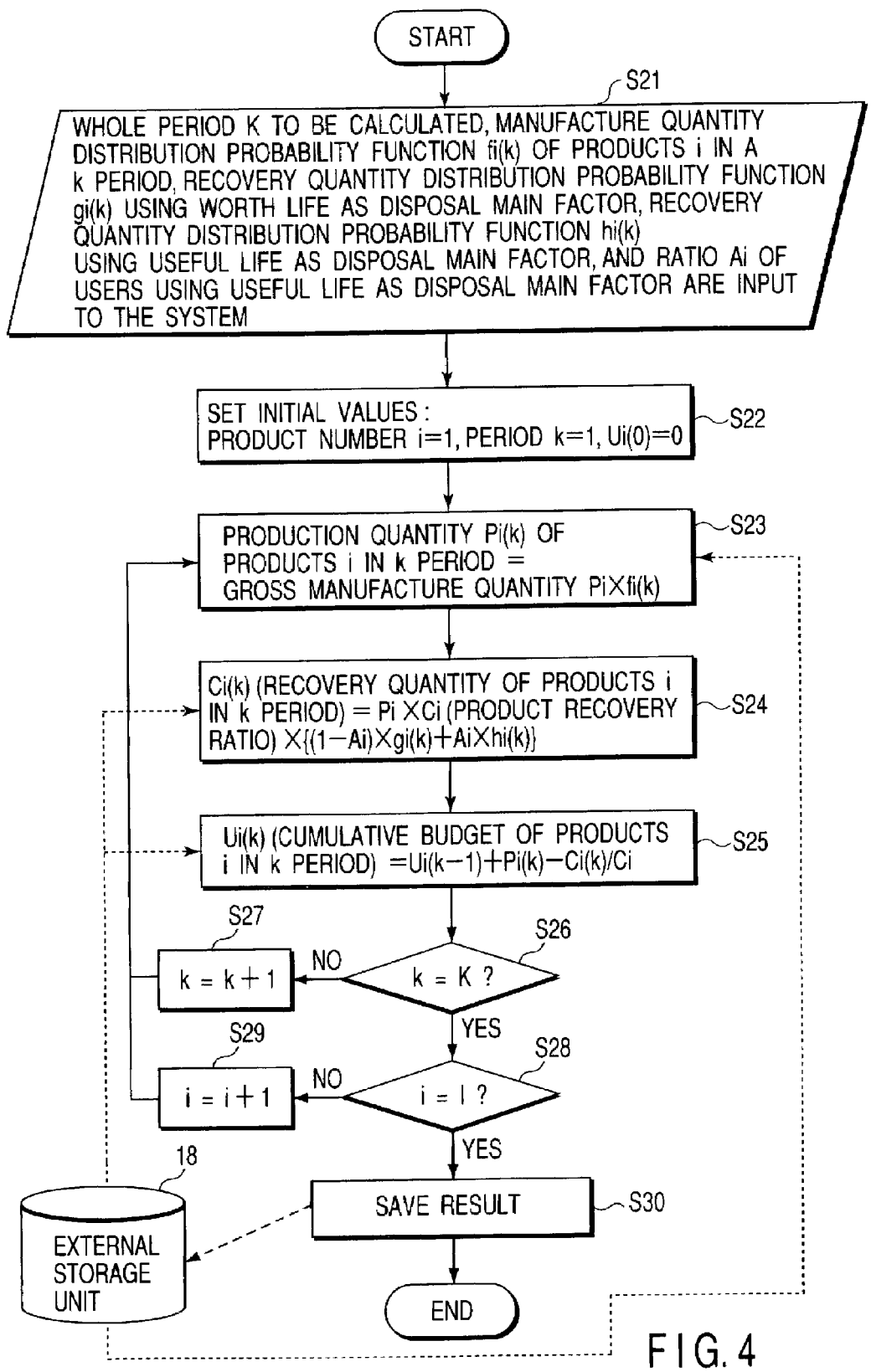
FIG. 4 is a flowchart showing a process procedure for obtaining product recovery quantity distribution.

If such a process of the life cycle modeling is completed, the supplying quantity of reuse parts and recycling materials is predicted by the procedure shown in FIG. 4 (step S2 of FIG. 2). The process for predicting the feeding quantity is performed by the product recovery quantity distribution prediction unit 11.

According to the procedure shown in FIG. 4, the whole period K to be calculated, manufacture quantity distribution probability function fi(k) of products i in a k period, recovery quantity distribution probability function gi(k) using a worth life as the disposal main factor, recovery quantity distribution probability function hi(k) using a useful life as the disposal main factor, and a rate Ai of users using the useful life as the disposal main factor are input to the system (S21). As for gi(k) and hi(k), the peak position of recovery distribution exists at the position shifting only by the product worth life and product useful life from the peak position of manufacture quantity distribution (cf. FIG. 6B). Initial values, i.e., product number i=1, period k=1, total number of products U i (0)=0 are set (S22). Pi (k) (production quantity in k period)=Pi×fi(k) (gross manufacture of products i) is calculated (S23). Ci (k) (recovery quantity of product i in k period)=Pi×Ci (product recovery rate)×{(1−Ai)×gi(k)+Ai×hi(k)} is calculated (S24).

U i (k) (cumulative budget of products i in k period)=Ui (k−1)+Pi(k)−Ci(k)/Ci is calculated (S25). k=k is determined (S26). When this determination is NO, 1 is added to k (S27), and the process returns to step S23. When the determination is YES, i=I is determined (S28). When this determination is NO, 1 is added to i (S29), and the process returns to step S23. When the determination in step S28 is YES, the result is stored in the external storage unit 18 (S30).

Figure 5:
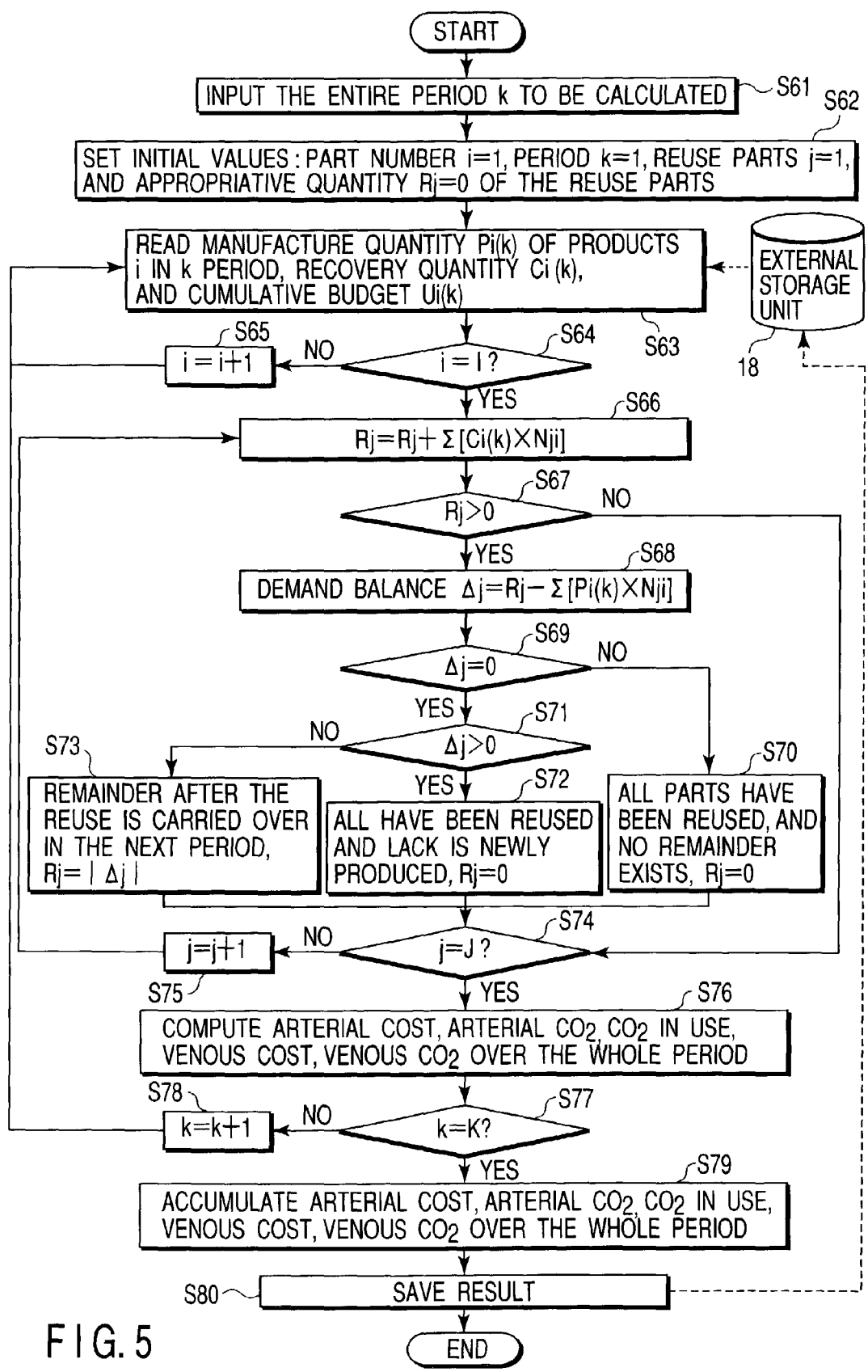
FIG. 5 shows a flow of environmental impact/cost integration.

If the feeding quantity prediction of the reuse parts and recycling materials is over, the environmental impact/cost integration is performed according to the procedure of FIG. 5 (step S3 of FIG. 2). In this procedure, the whole period k to be calculated is input to the system (S61). Initial values are set. In other words, part number i=1, period k=1, reuse parts j=1, and appropriative quantity of the reuse parts j, i.e., Rj=0 are set (S62). The manufacture quantity Pi(k) of products i in k period, recovery quantity Ci(k), and cumulative budget Ui(k) are read from the external storage unit 18 (S63). i=I is determined (S64). I is the number of kinds of products to be evaluated. When this determination is NO, 1 is added to i (S65), and the process returns to step S63. When the determination is YES, Rj=Rj+Σ[Ci(k)×Nji] is calculated (S66). Where Σ[Ci(k)×Nji] is the grand total of all kinds of products kind, and Nji is the number of parts j used for the product i.

Rj>0 is determined (S67). When this determination is YES, the demand balance Δj=Rj+Σ[Pi(k)×Nji] is calculated (S68). Σ[Pi(k)×Nji] is the grand total of all kinds of products, and Nji is the number of parts j used for the product i. Then, Δj=0 is determined (S69). When this determination is YES, all parts have been reused, and no remainder exists. That is, Rj=0 is decided (S70). When the determination is NO, Δj>0 is determined (S71). When this determination is YES, all have been reused and lack is newly produced. That is, Rj=0 is decided (S72). When the determination of step S71 is NO, the remainder after the reuse is carried over in the next period, and Rj=|Δj| is decided (S73).

Then, j=J is determined (S74). When this determination is NO, 1 is added to j (S75), and the process returns to step S66. When the determination is YES, a company cost in k period and generated $CO_2$ are computed (S76). The company costs include material supply costs, manufactures' costs, distribution costs, product recovery costs, reuse costs, recycling costs, and disposal costs in the product life cycle. The costs in k period in these costs are accumulated. The generated $CO_2$ includes $CO_2$ occurring in each stage in the entire product life cycle, i.e., materials supply, manufacture, circulation, use, product recovery, reuse, recycling, or disposal. The amounts of generated $CO_2$ in k period in these $CO_2$ are accumulated. Then, k=k is determined (S77). When this determination is NO, 1 is added to k (S78), and the process returns to step S63. When the determination is YES, the company cost and the amount of generated $CO_2$ over the whole period are calculated (S79), and the result is stored in the external storage 18 (S80).

The environmental impact/cost integration process based on step 3 of FIG. 2 is performed using information of the environmental impact information database 16 and cost information database 17 by the environmental impact/cost integration module 13, to compute environmental impact and cost for the whole of multi-generation products.

The accumulation result is displayed on the display 14 (step S4 of FIG. 2). As a result, the operator can know the environmental impact and cost as the whole of multi-generation products. Furthermore, when the reuse and recycling are executed, the range of products applicable to the reuse and recycling can be distributed appropriately. Thus, the most suitable parts reuse and materials recycling taken account of both of LCA and LCC are executable.

The brief of operation of the present system is as described above. The point to be realized by the present system is to realize the operation that can provide the greatest effect in view of LCA and LCC by diverting the used product to reuse parts and recycling materials without over supply or shortages in the next manufacturing. Therefore, in the present system, it is a key point to predict the feeding quantity of reuse parts/recycling materials in precision and simplicity. Therefore, this point will be described concretely.

<Prediction of Manufacture Quantity of Products and Recovery Quantity Thereof>

In the present system, the feeding quantity of reuse parts/recycling materials are predicted by the product recovery quantity distribution prediction unit 11 as described above. The present system performs prediction using an approximation model of the recovery distribution as described below. As a result, the feeding quantity of reuse parts/recycling materials can be predicted realistically while planning simplifying of processing as much as possible.

Generally, when employing the reuse parts and recycling materials in a series of products, the effect on the environmental impact and cost is influenced by the manufacturing number of products, the number of recovery products and the manufacture time (time for pumping the products into the market). This means that if the environmental impact and cost is going to be estimated precisely, the reuse parts and recycling materials are treated every product, but must be treated as a group generating environmental impact and cost in a period. For this reason, the approximation model 1 is prepared as a representation system in the embodiment.

<Approximation Model 1>

The embodiment is primarily featured in that a retrieve state is modeled in a realistic state, and the supply quantity of reuse parts/recycle materials is predicted in order to carry out maximally simplified processing. The LCA and LCC is estimated based on this prediction.

In the real world (in reality), the distribution of manufactured products in number within a predetermined period mainly depends on the will of product manufacturers, and then, the distribution of product worth life and the product recovery rate mainly depend on the will of product users. As a result, the actual distribution of recovered products in number is determined.

Figure 6:
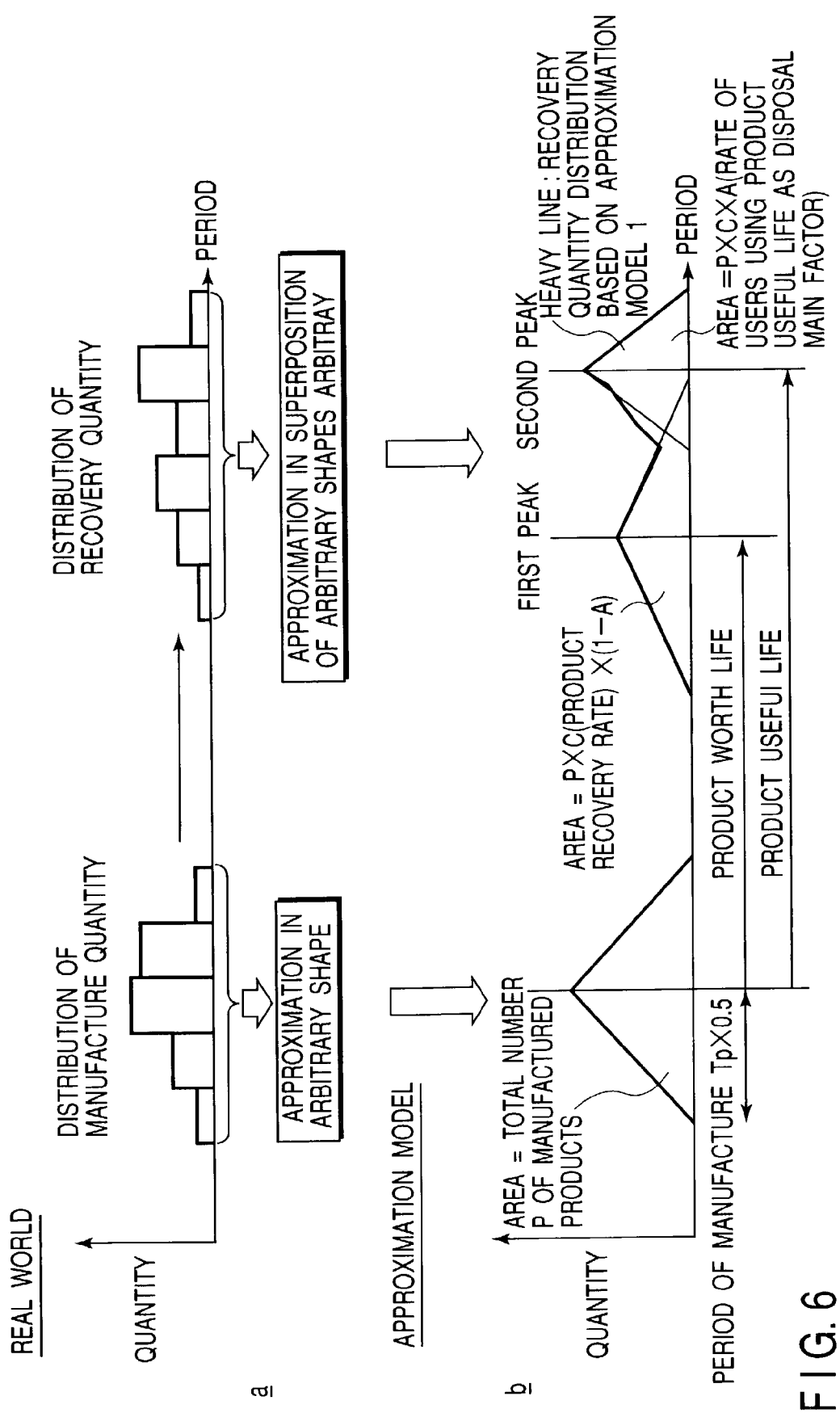
FIG. 6 shows an approximation model 1 of recovery quantity distribution with respect to quantity of manufacture.

The explanation of the actual world which "approximation model 1" assumes is shown at (a) in FIG. 6. The "approximation model 1" is modeled so as to reflect the actual world approximately faithfully as follows. In other words, the distribution of manufactured products approximates to an arbitrary shape. In FIG. 6, the distribution of manufactured products shows a triangle distribution, but may be similar to a rectangular distribution.

In this method, the distribution of recovery products approximates to a superposition of two arbitrary shape distributions having a peak of a product worth life and a peak of a product useful life as shown at (b) in FIG. 6. The product worth life corresponds to a period during which the product maintains its value for a product user. The product useful life corresponds to a period during which a product maintains a failure rate smaller than a failure rate that the product is demanded. The product useful life and product worth life are determined for each product. The product useful life and product worth life are decided for every product by a user of this system (the person designing and developing the product to be evaluated) based on real conditions and experience.

This approximation model is suitable for a product category (information communication equipment, high end personal computer, etc.) brought to a market changing product specification by for example, the fashion or technical innovation in sequence. In addition, the period shown as a horizontal axis in a graph of FIG. 6 can be years or months.

The embodiment enables precise prediction of the quantity of used products to be recovered every period. This embodiment is a simple technique, but has an effect computable as a model very near to the distribution of actual recovery products.

When the approximation model of recovery distribution is applied to the product recovery quantity distribution prediction module 11, and arithmetic processing is performed to the approximation model in consideration of hours for working (cleaning, inspection, etc.) required on the reuse really and hours (necessary days of material maker) for working required on materials recycling, the feeding quantity of reuse parts and recycling materials can be predicted so as to match more to actual value. As a result, in the next manufacture, the reuse parts and recycling materials which are diverted from the used products are supplied without over supply or shortages, and the maximum effect is provided from the viewpoint of LCA and LCC.

The reuse parts and recycling materials to be diverted from the used products must be predicted before manufacturing a product to be produced next, and supplied without over supply or shortages at the start of manufacturing. Therefore, it is necessary to set each approximation model to an optimum condition to perform the recovery quantity prediction in precision. However, in the operative initialization, the recovery quantity is determined experientially, thus it may shift from reality. This prediction is tuned up gradually, by making this system grow up by learning, to provide the model to fit reality.

The procedure of processing in the present system is as follows:

[1] Life cycle modeling

[2] Prediction of manufacture quantity of products and recovery thereof

[3] Environmental effect and cost accumulation

[4] Presentation of environmental effect and cost as the result obtained.

Figure 3:
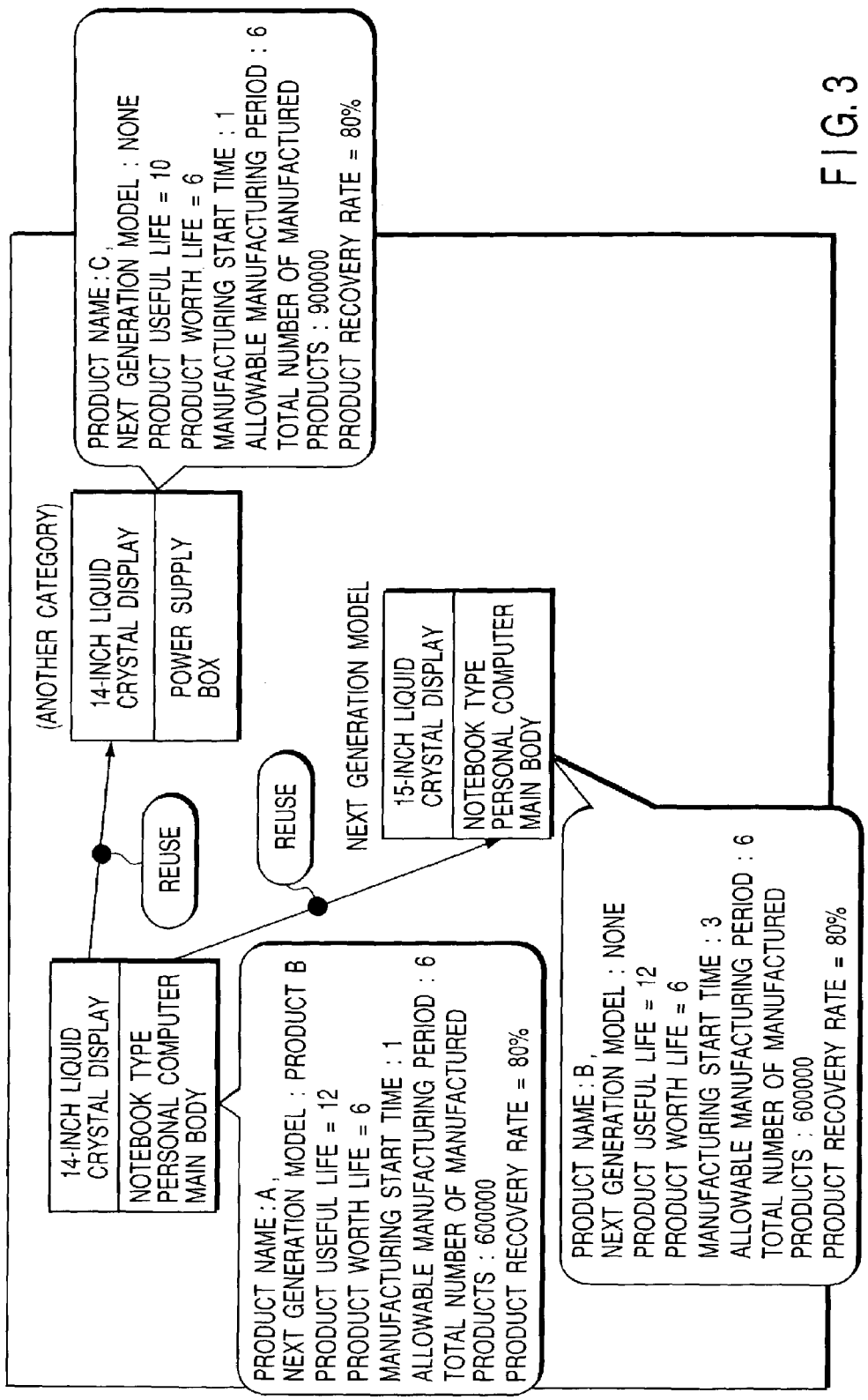
FIG. 3 shows a screen that displays a result obtained by a life cycle modeling process.

The life cycle modeling with [1] is a process for deciding to divert what of the previous generation product that is washed-up and recovered, to which of the next generation product that will be manufactured from now on. This process is performed for multi-generation products. In the present invention, a flow direction is defined in executing parts reuse and materials recycling closed among self-manufactured products or product series. For this reason, the material flow is explicitly indicated by arrows. Information such as "product useful life", "product worth life", "manufacture start time", "total manufacture number", etc. about each product is described to make the definition of the flow direction reflect (FIG. 3). For this reason, it is determined what parts and what materials recovered from what product should be diverted to what portion of what product. The materials recycling is not considered in this example.

After the life cycle modeling has completed, feeding quantity for the parts reuse and the materials recycling is predicted using the approximation model. The model ("approximation model 1") of FIG. 6 is used as the premise of the prediction for simplification of description. Therefore, after the product was used, there is only two alternatives, that is, parts reuse and waste disposal. The product recovery rate is a fixed value of 80[%], and period required for materials supply of a product, manufacture, circulation, recovery, disposal and reuse is ignored. However, the product recovery rate of 80[%] is an experience value.

On the other hand, the environmental effect and cost information of a product unit are obtained from environmental effect information DB, cost information DB and reuse recycling information DB. The environmental effect information used here is calculated by a conventional LCA technique.

By taking the actual working hours required for the parts reuse (hours for cleaning and inspection), and the working hours required for materials recycling (essential days of materials maker) into account in the approximation model of the above-mentioned recovery distribution, the feeding quantity of the reuse parts and recycling materials can be predicted more practically. When the reuse and recycling are performed using this predicted value, the environmental effect and cost are accumulated, and the accumulated value is evaluated. This procedure is shown in FIG. 5.

Figure 7:
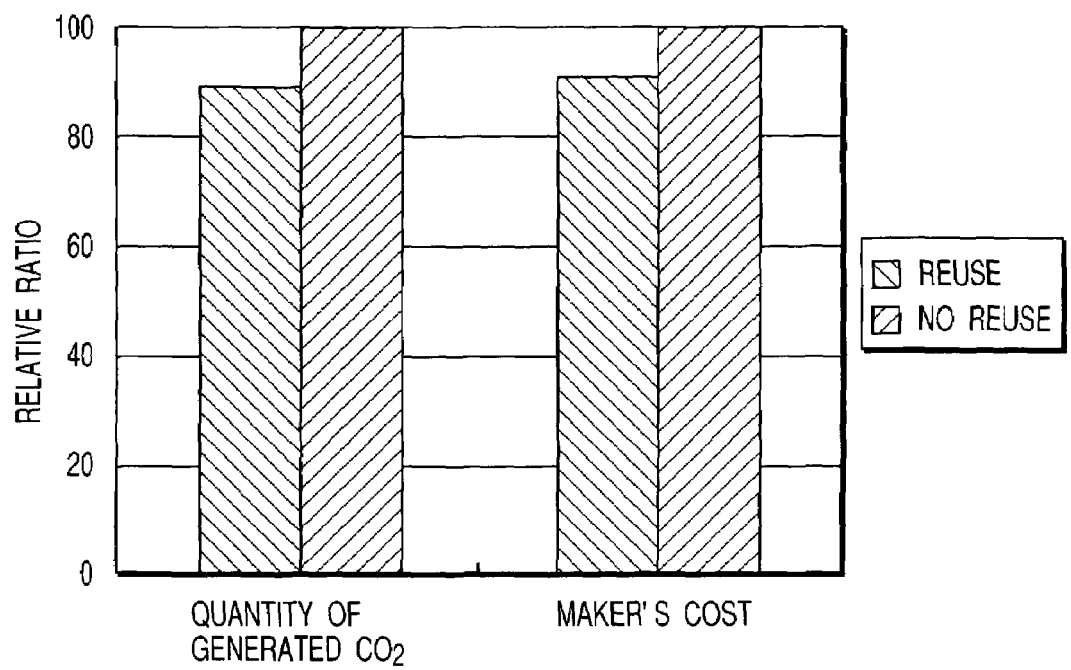
FIG. 7 shows a reuse effect.

FIG. 7 shows a result obtained by using the present system. This shows an example which calculates the environmental effect and cost according to the procedure of FIG. 5 about the life cycle model shown in FIG. 3 using the "approximation model 1" ((b) in FIG. 6) and the prediction result of recovery quantity distribution shown in FIG. 4. FIG. 7 shows the comparison result of a case wherein the parts reuse is performed with a case wherein the parts reuse is not performed. FIG. 7 shows a condition wherein a $CO_2$ generation rate in performing the parts reuse and a reduction effect of a maker cost are visually displayed in a form of bar graph on the screen of the display 14. By comparing reuse with non-reuse, it is possible to grasp objectively the degree of an effect of the reuse under the estimated condition to be applied to a next product.

As thus described, the reuse effect in the multi-generation products can be quantitatively compared by an evaluation method of the embodiment. In addition, such a comparison is completely similarly possible in case of recycling. Further, a schemer can refer to the detail data shown in FIGS. 8A and 8B according to need.

According to the present invention, there is provided a reuse scheduling support apparatus in executing at least one of reuse of product or materials recycling, which comprises a modeling unit configured to execute life cycle modeling between reuse products that is a process for performing definition for deciding what portion of the recovery product should be diverted to what new product, a prediction unit configured to predict feeding quantity of reuse parts by applying a model modeled by the modeling unit, and an environmental impact and cost evaluation unit configured to evaluate environmental impact and cost that are born in recycling on the basis of a prediction result of the prediction unit.

According to the present invention, there is provided a reuse scheduling supporting method in executing at least one of product reuse and materials recycling, which comprises executing life cycle modeling between reuse products that is a process for performing definition for deciding what portion of the recovery product should be diverted to what new product, predicting feeding quantity of reuse parts by applying a model modeled by the modeling unit, and evaluating environmental impact and cost that are born in recycling on the basis of a prediction result of the prediction unit.

When the parts reuse and materials recycling are executed, the environmental impact and cost precision can be evaluated accurately in line with reality, and effective parts reuse and materials recycling can be executed.

Since the environmental impact as the whole series can be estimated by the above embodiment, when carbon tax (carbon dioxide discharge tax) examined as a part of movement to tax on environmental load, for example, is enforced, it is possible to evaluate and determine parts reuse and materials recycling most suitable for minimizing the total cost taking account the environmental cost that has to be born.

The method described in the embodiment in the present invention is realized as a program executable by a computer, and may be stored in a recording medium such as a magnetic disc (flexible disk, hard disk), an optical disc (CD-ROM, CD-R, CD-RW, DVD, MO), a semiconductor memory, or may be transmitted via a network.

Figure 9:
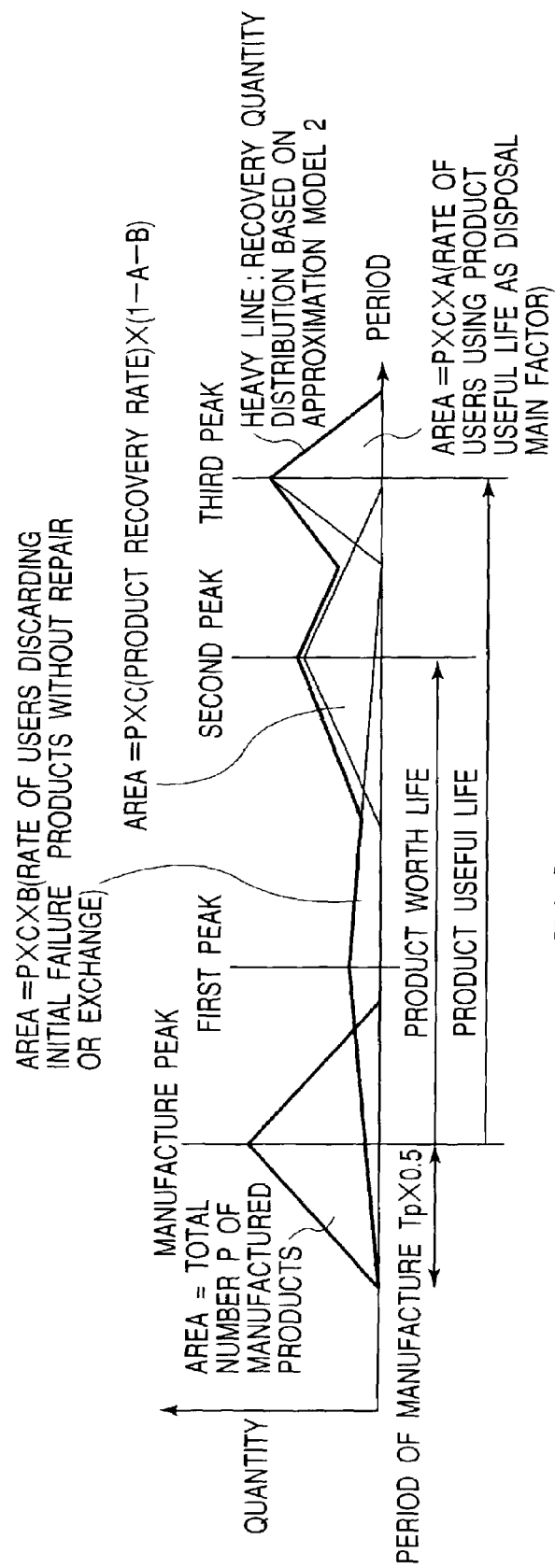
FIG. 9 shows an approximation model 2 of recovery quantity distribution with respect to quantity of manufacture.

As another embodiment of the present invention, the recovery quantity distribution probability function is not limited to two functions of recovery quantity distribution probability function gi(k), using a worth life as a disposal main factor, and recovery quantity distribution probability function hi(k) using a useful life as the disposal main factor. Three or more recovery quantity distribution probability functions are used according to the assumed disposal factor. If users disposing a product caused an initial failure without repair or change exist at a rate of Bi, the recovery quantity distribution probability function mi(k) using an initial failure as a disposal main function is a function having a first peak in FIG. 9.

Figure 10:
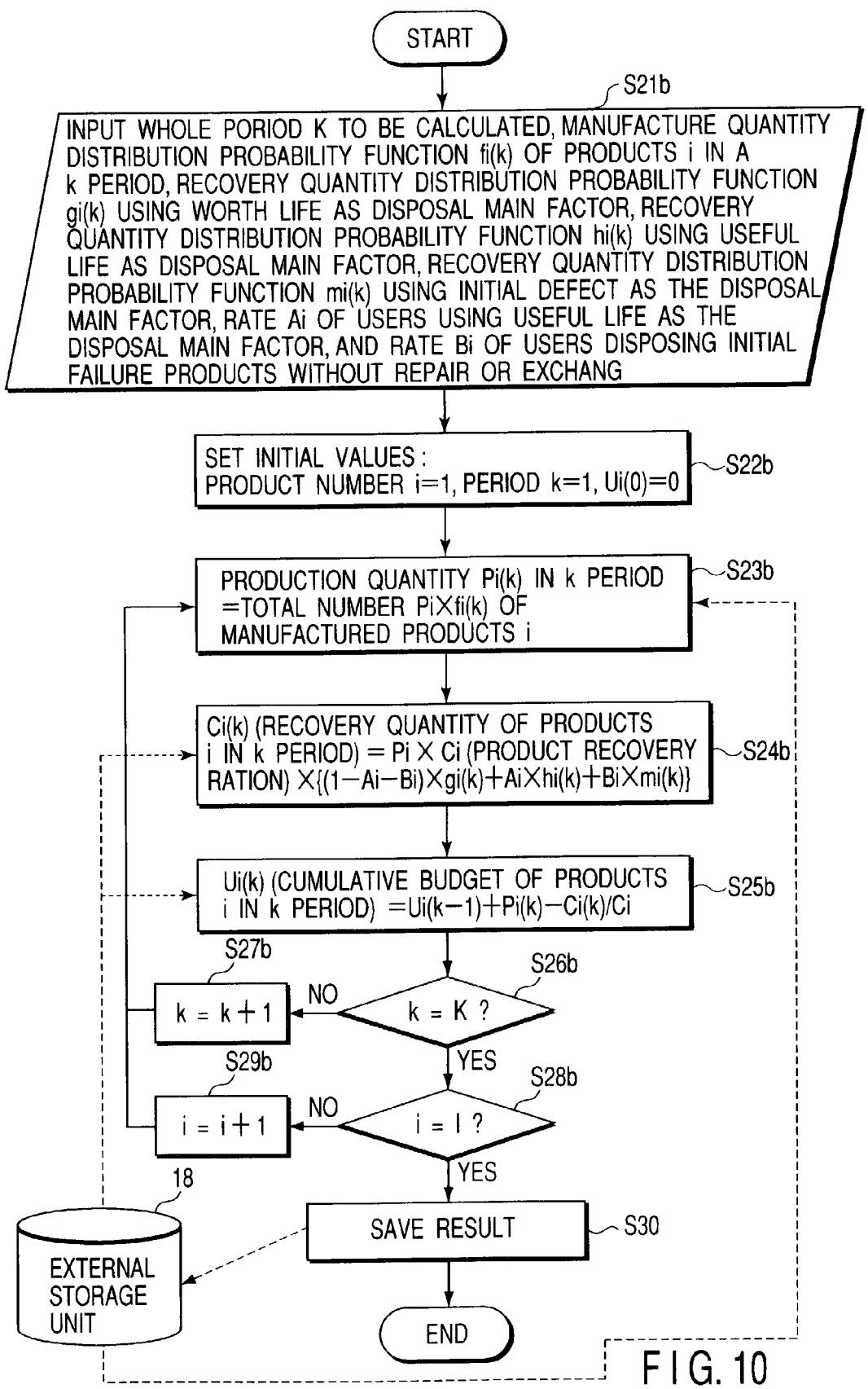
FIG. 10 is a flowchart showing prediction procedure of product recovery quantity distribution.

Similarly to the former embodiment, the feeding quantity of the reuse parts and recycling materials is predicted according to the procedure shown in FIG. 10. According to the procedure shown in FIG. 10, the whole period K to be calculated, manufacture quantity distribution probability function fi(k) of products i in a k period, recovery quantity distribution probability function gi(k) using a worth life as the disposal main factor, recovery quantity distribution probability function hi(k) using a useful life as the disposal main factor, recovery quantity distribution probability function mi(k) using initial defect as the disposal main factor, a user rate Ai using the useful life as the disposal main factor, and a rate Bi of users disposing initial failure products without repair or exchange are input to the system (S21b). In this time, As for gi(k), hi(k), the peak position of recovery distribution exists at the position shifted from the peak position of manufacture quantity distribution only the product worth life and product useful life (cf. FIG. 9).

Initial values, i.e., product number i=1, period k=1, total number of products U i (0)=0 are set (S22b). Pi(k) (production quantity in k period)=Pi X fi(k) (total number of manufactured products i) is calculated (S23b). Ci(k) (recovery quantity of products i in k period)=Pi×Ci (product recovery rate)×{(1−Ai−Bi)×gi(k)+Ai×hi(k)+Bi×mi(k)} is calculated (S24b).

U i (k) (the cumulative number of products i in k period) =Ui(k−1)+Pi(k)−Ci(k)/Ci is calculated (S25b). k=k is determined (S26b). When this determination is NO, 1 is added to k (S27b), and the process returns to step S23b. When the determination is YES, i=I is determined (S28b). When this determination is NO, 1 is added to i (S29b), and the process returns to step S23b. When the determination in step S28b is YES, the result is stored in the external memory storage 18 (S30b).

If the feeding quantity prediction of the reuse parts and recycling materials is completed, the environmental impact/cost integration is performed according to the procedure of FIG. 5 (step S3 of FIG. 2). The following disposal factors can also be considered: disposal of products every season such as replacement purchases every bonus month and disposal of household goods for a move at transfer seasons, or disposal of old-type products that do not conform to new regulations.

Figure 11:
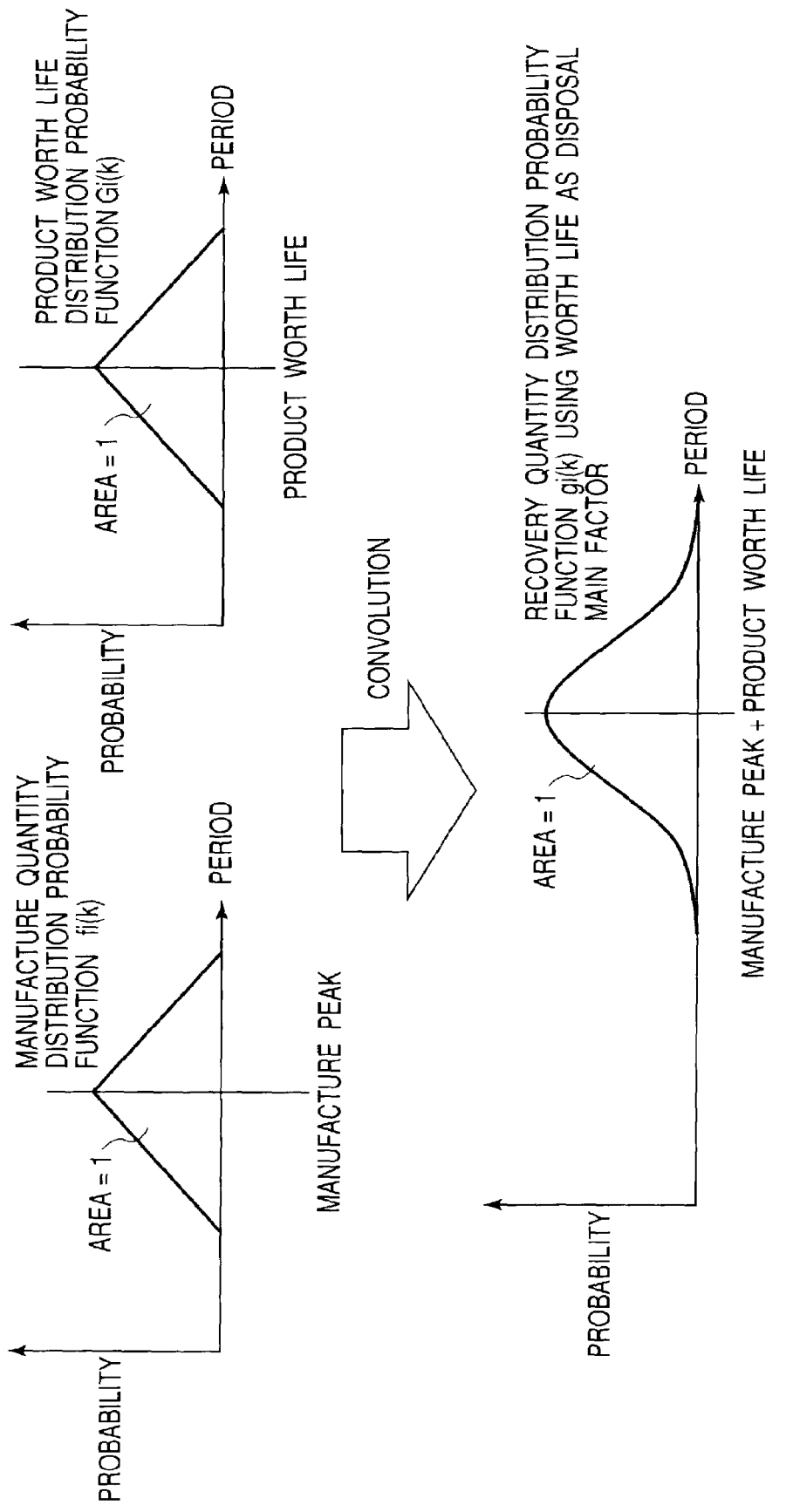
FIG. 11 shows an approximation model 3a of recovery quantity distribution.

In the above embodiment, as for gi(k), hi(k), the peak position of recovery distribution exists at the position shifted from the peak position or medium value of manufacture quantity distribution only by the product worth life and product useful life. The probability distribution may be incidental to the product worth life and product useful life as other embodiments. In other words, the recovery quantity distribution probability function Gi(k) using the worth life as a disposal main factor may be established by convolution of the product worth life distribution probability function G i(k) and manufacture quantity distribution probability function fi(k) (cf. FIG. 11).

Figure 12:
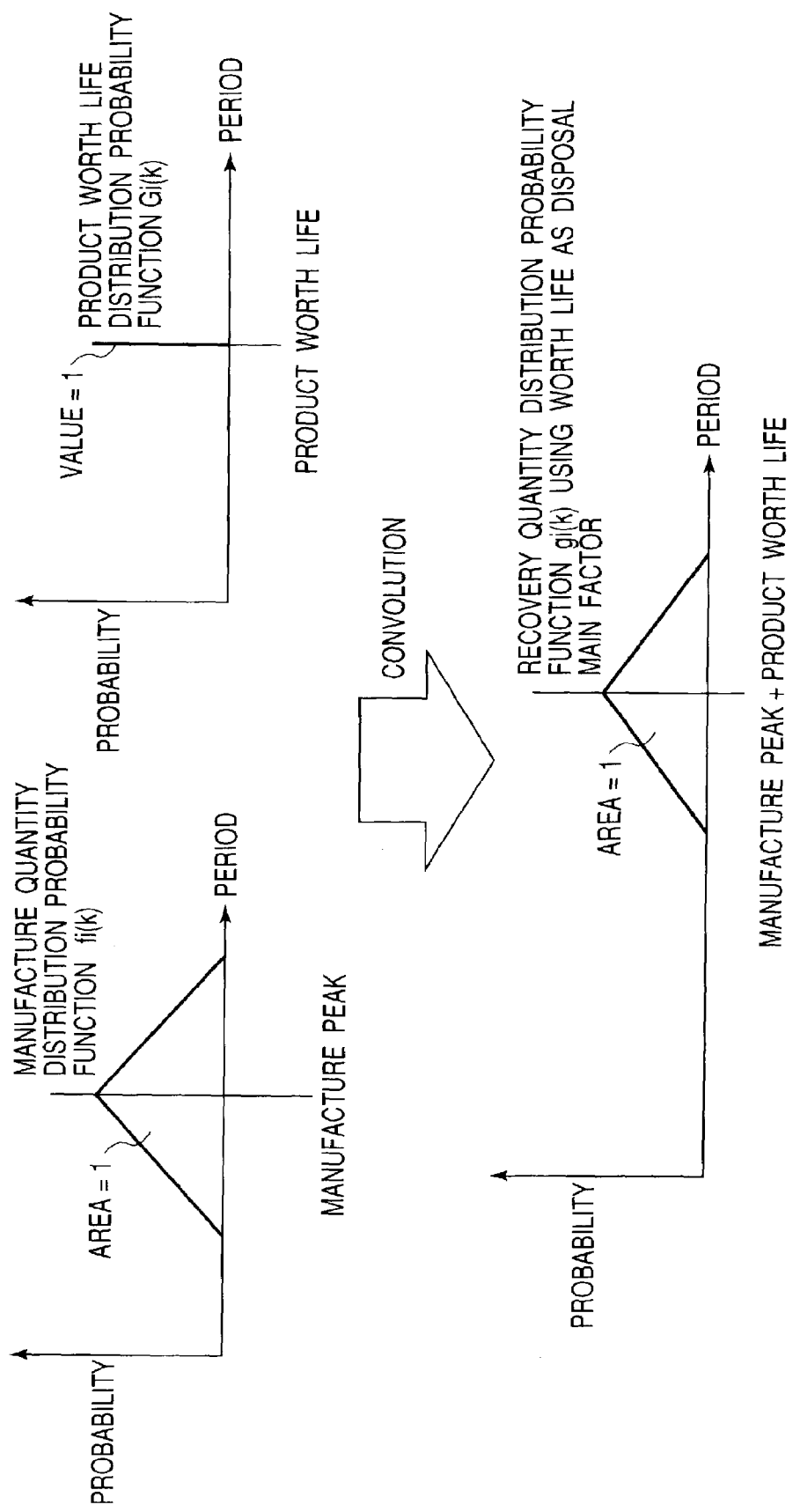
FIG. 12 shows an approximation model 3b of recovery quantity distribution.

Similarly, the recovery quantity distribution probability function gi(k) using the useful life as a disposal main factor may be established by convolution of the product useful life distribution probability function G i(k) and manufacture quantity distribution probability function fi(k). For example, when the product worth life distribution probability function G i(k) and product useful life distribution probability function H i(k) are defined as the delta function which has a value 1 only in the constant product worth life or product useful life, the recovery quantity distribution probability function gi(k) and recovery quantity distribution probability function hi(k) correspond to that the peak position of recovery distribution exists at the position shifted from the peak position or medium value of manufacture quantity distribution only by the product worth life and product useful life (cf. FIG. 12).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer implemented environmental impact estimation method comprising:
   storing information related to reuse objects and recycle objects in a memory unit;
   performing life cycle modeling to make a life cycle model, the life cycle modeling including reading the information related to the reuse objects and the recycle objects from the memory unit, selecting some of the reuse objects and the recycle objects which can be diverted to a new product from a recovery product using the information read, and combining the reuse objects and the recycle objects selected together to assemble the new product;
   predicting, as a superposition of a plurality of recovery distribution shapes, recovery quantity distribution of products used as the reuse objects by the life cycle modeling to predict a recovery quantity of the reuse objects and/or the recycle objects, using the life cycle model, at least one of the recovery distribution shapes having a peak corresponding to a product worth life or a product useful life; and
   generating an environmental impact and a cost involved in reuse or recycle based on prediction result obtained by the predicting.

2. The method according to claim 1, wherein the life cycle modeling includes grouping icons prepared by iconizing part names into a plurality of icon groups, and inputting product information corresponding to the icon groups, and attaching product LCA information and LCC information of component parts of the product as related information.

3. The method according to claim 1, wherein a peak position of the recovery distribution exists at a position shifted only by the product worth life and product useful life from a peak position of a manufacture quantity distribution.

4. The method according to claim 1, wherein the cost includes a cost obtained by accumulating, in k period, a material supply cost, a manufactures' cost, a distribution cost, a product recovery cost, a reuse cost, a recycling cost, and a disposal cost in the product life cycle, and the environmental impact includes $CO_2$ obtained by accumulating, in k period, $CO_2$ occurring in each stage in the product life cycle including materials supply, manufacture, circulation, use, product recovery, reuse, recycling, or disposal.

5. A computer implemented environmental impact estimation method comprising:
   storing information related to reuse objects and recycle objects in a memory unit;
   performing life cycle modeling to make a life cycle model, the life cycle modeling including reading information related to the reuse objects and the recycle objects from the memory unit, selecting some of the reuse objects and the recycle objects which can be diverted to a new product from a recovery product using the information read, and combining the reuse objects and recycle objects selected together to assemble a new product;
   predicting, as a superposition of two recovery distribution shapes whose peaks correspond to a product worth life and a product useful life, recovery quantity distribution of products used as the reuse objects by the life cycle modeling in order to predict a recovery quantity of at least one recovery of the reuse objects and recycle objects, using the life cycle model; and generating an environmental impact and a cost involved in reuse or recycling based on prediction result obtained by the predicting.

6. The method according to claim 5, wherein the life cycle modeling includes grouping icons prepared by iconizing part names into a plurality of icon groups, and inputting product information corresponding to the icon groups, and attaching product LCA information and LCC information of component parts of the product as related information.

7. The method according to claim 5, wherein a peak position of the recovery distribution exists at a position shifted only by the product worth life and product useful life from a peak position of a manufacture quantity distribution.

8. The method according to claim 5, wherein the cost includes a cost obtained by accumulating, in k period, a material supply cost, a manufactures' cost, a distribution cost, a product recovery cost, a reuse cost, a recycling cost, and a disposal cost in the product life cycle, and the environmental impact includes $CO_2$ obtained by accumulating, in k period, $CO_2$ occurring in each stage in the product life cycle including materials supply, manufacture, circulation, use, product recovery, reuse, recycling, or disposal.

* * * * *